United States Patent Office 3,766,233
Patented Oct. 16, 1973

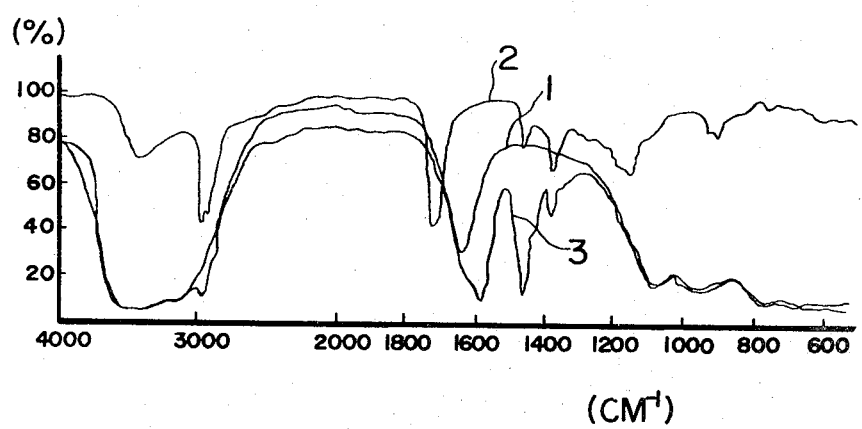

3,766,233
ANTIPERSPIRANTS
Kazuhiro Tsukada, Tokyo, Japan, assignor to
Sankyo Company Limited
Filed Dec. 15, 1971, Ser. No. 208,099
Claims priority, application Japan, Dec. 24, 1970,
45/129,288
Int. Cl. C07f 5/06
U.S. Cl. 260—448 R                          7 Claims

ABSTRACT OF THE DISCLOSURE

A process for the preparation of a novel aluminium hydroxychloride compound which may be used as antiperspirants used for the preparation of cosmetics.

This invention relates to a novel complex compound consisting of aluminium hydroxychloride, known as an antiperspirant, and terpenoids.

Aluminium hydroxychloride, known as effective antiperspirants, has a serious defect that it is hardly soluble in auxiliary solvents such as absolute alcohols and propellants normally used in aerosols. Thus, an aerosol antiperspirant of the powdered suspension type has been proposed (Japanese patent publication No. 798/70) but, in this case, there is a serious risk that the aerosol of the powdered suspension type will give rise to gas leakage and valve clogging.

In order to make aluminium hydroxychloride soluble in absolute alcohol, it is known to prepare its complex compound with glycols (U.S. Pat. No. 3,420,932), or with polyhydroxy compounds (British Pat. No. 1,009,959) or with phenolsulfonic acid or its salts (Japanese patent publication No. 22,437/70). These complex compounds, however, are not entirely satisfactory as they are apt to attack metallic vessels.

Thus, the solution type aerosol cosmetics containing aluminium hydroxychloride has not been up to now available commercially.

The primary object of the present invention is to provide an aluminium hydroxychloride compound which can be dissolved in ethanol or other organic solvents in higher concentrations and which is less corrosive to metallic vessels. Other object of the present invention is to provide a solution type aerosol antiperspirant containing aluminium hydroxychloride compound in an effective concentration.

As a result of our researches aimed to attain these objects, it has been discovered that a novel complex compound of aluminium hydroxychloride less corrosive to metallic vessels can be prepared by reacting aluminium hydroxychloride with terpenoids, such as hydroxycitronellal, cyclamen aldehyde, geraniol, linalool, geranyl acetate, and 1-menthol, which are non-polar, oleophilic and sparingly soluble in water to a higher extent than the known glycols, polyhydroxy compounds, or phenolsulfonic acids and their salts.

This novel complex compound can be dissolved in absolute or aqueous alcohols and therefore can be used effectively for the preparation of cosmetics of the perspiration inhibitive type in the form of aerosols, roll-ons, sticks, pastes, jelly and cream. Above all, since absolute alcohol is compatible or mutually soluble with liquefied chlorofluorohydrocarbons, it is especially convenient for the preparation of aerosol antiperspirants.

The present invention will be more clearly understood by the following description and the drawing attached hereto in which:

FIG. 1 is a chart showing infrared absorption spectrum characteristics proper to the complex compound of the present invention.

In preparing the novel complex compound according to the present invention, a given amount of aluminium hydroxychloride is dissolved in water to give an aqueous solution containing aluminium hydroxychloride in a desired concentration, preferably an aqueous solution containing 50 wt. percent of aluminum hydroxychloride. Then, the terpenoid, such as hydroxycitronellal, is added in an amount necessary to produce a complex compound having the desired molar ratio. Then, the lower alcohols, such as methanol, ethanol or isopropanol, are added in sufficient amounts to produce a homogeneous solution. The solution thus obtained is heated to a temperature of 40 to 120° C. under reduced pressure of 60 to 100 mm. Hg. The complex compound can then be isolated upon elimination of the solvents.

The complex compound thus obtained is then pulverized and dried into a stable powdered porduct. The product thus formed is ready for practical usage when dissolved in alcohol or other solvents. If necessary, the powdered product can be further purified through recrystallization and other known processes.

The molar ratio of the terpenoid and the aluminium hydroxychloride contained in the thus obtained complex compound can be varied within a range of 1 mole of terpenoid to 1 to 12 moles of aluminium hydroxychloride. It is to be noted that the complex compound of the aluminium hydroxychloride and the terpenoid prepared in this way contains 2 to 4 moles of bound water.

The novel complex compound can be dissolved in higher concentrations in absolute alcohols, aqueous alcohols, denaturated alcohols, isopropanol, n-butanol, propylene glycol and glycerine and can be used as highly effective astringents for the preparation of cosmetics with the property of inhibiting perspiration. Above all, since the above-mentioned solution containing the novel complex compound in a higher concentration is compatibile or mutually soluble with chlorofluorohydrocarbons and other materials used as aerosol propellants, it can be used conveniently for the preparation of aerosol cosmetics having the property of inhibiting perspiration. As an example, the 20% solution of the present complex compound in absolute alcohol is miscible with trichloromonofluoroethane, dichlorofluoroethane, dichlorotetrafluoroethane, vinyl chloride, dimethyl ether or liquefied petroleum gases, which are employed in aerosols as propellants.

There is no specific limitation to the aluminium hydroxychloride used for the preparation of the present novel complex compound, and the ratio of aluminium to chlorine can be varied within the range of theoretical limitation. A marketed product of the rational formula of $Al_2(OH)_5Cl \cdot nH_2O$ is, however, preferred within a range of the molar ratio of aluminium and chlorine from 1.9 to 2.1 to 1.

As terpenoids which can be prepared into the complex compound with aluminium hydroxychloride, hydroxycitronellal, cyclamen aldehyde, 1-methanol, geraniol, geranyl acetate, linalool, and methyl ionone may be mentioned. Hydroxycitronellal is, however, most preferred from a viewpoint of economy and productivity.

The process of the present invention will be further explained in detail hereinbelow by giving several examples.

EXAMPLE 1

Preparation of complex compound of aluminium hydroxychloride and hydroxycitronellal 100 g. of aluminium hydroxychloride is dissolved in 100 g. of water to give a 50 percent aqueous solution. 30 g. of hydroxycitronellal and 100 g. of methanol are added in this order to the aqueous solution to give a homogeneous solution. The solution thus obtained is heated under reduced pressure of 60 to 100 mm. Hg to a temperature of 60 to 100° C. to remove the solvent and the product thus obtained is then dried and pulverized to give 120 g. of the complex compound. From the practical point of view, the compound thus obtained can be used as it is. When the further purification is desired, however, the compound is dissolved in 100 ml. of methanol, filtered, added with 300 to 400 ml. of acetone, precipitated, filtered, washed with acetone to remove unreacted hydroxycitronellal, and then dried at 60° C. for half an hour to give the desired complex compound.

The thus obtained product, in which aluminium hydroxychloride and hydroxycitronellal are combined in a molar ratio of about 5.4:1, has the following composition:

| | Found, percent |
|---|---|
| Al | 21.4 |
| $Al_2O_3$ | 40.4 |
| Cl | 14.1 |
| $H_2O$ (bound water) | 22.6 |
| Hydroxycitronellal | 12.6 |

Upon comparison of the solubility of the complex compound in absolute ethanol and that of aluminium hydroxychloride, it will be seen from Table 1 that the complex compound is dissolved in higher than 50%, while aluminium hydroxychloride is dissolved in less than 1%.

TABLE 1

Solubility of the complex compound of aluminium hydroxychloride and hydroxycitronellal

| Solvent: | Solubility (wt. percent) |
|---|---|
| Methanol | Not less than 50. |
| Ethanol | Not less than 50. |
| Sec.-butanol | 3.5. |
| Propylene glycol | 6.0. |
| Glycerine | 1.0. |
| N,N-dimethylformamide | 3.0. |

FIG. 1 is a diagram showing infrared absorption spectrum characteristics, in which 1 represents those for aluminium hydroxychloride, 2 represents those for hydroxycitronellal and 3 represents those for the complex compound of aluminum hydroxychloride and hydroxycitronellal according to the present example. It is obvious from this diagram that a certain chemical change has taken place by the process of the present invention.

EXAMPLE 2

Preparation of a complex compound of aluminium hydroxychloride and cyclamen aldehyde 50 g. of aluminium hydroxychloride was dissolved in 50 g. of water and 30 g. of cyclamen aldehyde was added to the solution. 250 g. of ethanol was then added to give a homogeneous solution. The solution was then heated to 60 to 80° C. under reduced pressure of 60 to 100 mm. Hg. to remove the solvent, and the product thus obtained was then dried and pulverized. The powdered product with a light brownish color thus obtained was then dissolved in absolute ethanol in a concentration higher than 50 percent.

EXAMPLE 3

Preparation of a complex compound of aluminium hydroxychloride and geranyl acetate 50 g. of aluminium hydroxychloride was dissolved in 50 g. of water, and 30 g. of geranyl acetate was added to the solution. 150 g. of ethanol was further added to give a homogeneous solution. The resulting solution was then heated under reduced pressure to remove the solvent and the product thus obtained was then dried and pulverized. The powdered product with light brownish color thus obtained was dissolved in absolute ethanol in a concentration higher than 20 percent.

EXAMPLE 4

Preparation of a complex compound of aluminium hydroxychloride and geraniol 50 g. of aluminium hydroxychloride was dissolved in 80 g. of water and 30 g. of geraniol was added to the solution. 100 g. of ethanol was further added to give a homogeneous solution. The solution was heated under reduced pressure to remove the solvent and the product thus obtained was dried and pulverized to give a powdered product with a light yellowish color. The powdered product thus obtained was then dissolved in absolute ethanol in a concentration higher than 30 percent.

EXAMPLE 5

Preparation of a complex compound of aluminium hydroxychloride and 1-menthol 50 g. of aluminium hydroxychloride was dissolved in 50 g. of water and 30 g. of 1-menthol was added to the solution. Then, 100 g. of ethanol was further added to provide a homogeneous solution. The solution thus obtained was heated under reduced pressure to remove the solvent and the product was then dried and pulverized to a powdered product with a white color. The powdered product was then dissolved in absolute ethanol in a concentration higher than 40 percent. This complex compound is soluble in absolute alcohol and is, therefore, convenient for the preparation of aerosol antiperspirants.

The typical formulation of an aerosol using the complex compound of the present invention is given below. It is to be noted that the following is a representative example only and is not intended for the limitation of the present invention.

EXAMPLE 6

| | (Wt. percent) |
|---|---|
| Complex compound of aluminium hydroxychloride and hydroxycitronellal (product of Example 1) | 7.0 |
| Ethylene oxide and oleic alcohol ester phosphate (Crodafos N–10A" available from Croda Nippon Ltd., Japan) | 1.0 |
| Oleic alcohol | 1.0 |
| Isopropyl millistate | 1.0 |
| Silicone oil | 0.6 |
| Ethanol | 39.2 |
| Trichloromonofluoromethane | 15.0 |
| Dichlorodifluoromethane | 35.0 |
| Perfume | 0.2 |
| Total | 100.0 |

The aerosol antiperspirants having the above formulation was filled in an aluminium can with no coating applied to its inner surface, and an accelerated storage test was carried out at 45° C. for a time interval of 3 months. Pinhole corrosion was not observed and there was no appreciable change in odor. A comparable aerosol product prepared under the same condition and formulation but with use of marketed complex compound soluble in absolute alcohol and consisting of aluminium hydroxychloride and propyrene glycol was put to an accelerated storage test which was continued at 45° C. for an interval of 3 months. It was observed that 82 percent of the tested products suffered from pinhole corrosion and these products were found to be unmarketable.

What is claimed is:

1. A process for the preparation of a complex compound of aluminum hydroxychloride and a terpenoid selected from the group consisting of hydroxycitronellal, cyclamen aldehyde, geraniol, linalool, geranyl acetate and 1-menthol, characterized in that 1 to 12 moles of aluminum hydroxychloride are reacted with 1 mol of said terpenoid.

2. An antiperspirant composition comprising a complex compound comprising from 1 to 12 moles of aluminum hydroxychloride and 1 mole of a terpenoid selected from the group consisting of hydroxy citronellal, cyclamen, aldehyde, geraniol, linalool, geranyl acetate and 1-menthol.

3. A composition of claim 2 wherein the complex compound comprises about 5.4 moles of aluminum hydroxychloride and one mole of hydroxycitronellal.

4. A composition of claim 2 wherein the complex compound comprises aluminum hydroxychloride and cyclamen aldehyde.

5. A composition of claim 2 wherein the complex compound comprises aluminum hydroxychloride and geranyl acetate.

6. A composition of claim 2 wherein the complex compound comprises aluminum hydroxychloride and geraniol.

7. A composition of claim 2 wherein the complex compound comprises aluminum hydroxychloride and 1-menthol.

References Cited

UNITED STATES PATENTS

| 2,155,961 | 4/1939 | Trowell | 260—448 R |
| 2,568,599 | 9/1951 | Weidlich et al. | 260—448 R X |
| 3,287,223 | 11/1966 | Theile et al. | 424—68 |

FOREIGN PATENTS

| 874,164 | 8/1961 | Great Britain | 260—488 AD |

WERTEN F. W. BELLAMY, Primary Examiner

U.S. Cl. X.R.

424—68